US011392207B1

United States Patent
Lin et al.

(10) Patent No.: US 11,392,207 B1
(45) Date of Patent: Jul. 19, 2022

(54) TOUCH DEVICE AND DISPLAY DEVICE FOR PROVIDING HAPTIC FEEDBACK

(71) Applicant: a.u.Vista Inc., Irvine, CA (US)

(72) Inventors: Chao-Hsien Lin, Irvine, CA (US); Tung-Tsun Lin, Irvine, CA (US); Ching-Huan Lin, Hsin-Chu (TW)

(73) Assignee: A.U. VISTA INC., Irvine, CA (US)

( * ) Notice: Subject to any disclaimer, the term of this patent is extended or adjusted under 35 U.S.C. 154(b) by 0 days.

(21) Appl. No.: 17/411,086

(22) Filed: Aug. 25, 2021

(51) Int. Cl.
*G06F 3/01* (2006.01)
*G06F 3/044* (2006.01)
*G06F 3/041* (2006.01)

(52) U.S. Cl.
CPC ............ *G06F 3/016* (2013.01); *G06F 3/0446* (2019.05); *G06F 3/0448* (2019.05); *G06F 3/04164* (2019.05); *G06F 2203/04104* (2013.01)

(58) Field of Classification Search
CPC .... G06F 3/016; G06F 3/0446; G06F 3/04164; G06F 3/0448; G06F 2203/04104
USPC ........................................................ 345/174
See application file for complete search history.

(56) References Cited

U.S. PATENT DOCUMENTS

| | | | |
|---|---|---|---|
| 8,780,060 | B2 | 7/2014 | Maschmeyer et al. |
| 9,448,662 | B2 * | 9/2016 | Sugita ..................... G06F 3/041 |
| 2015/0145657 | A1 | 5/2015 | Levesque et al. |
| 2017/0068318 | A1 * | 3/2017 | McClure ................. G06F 3/016 |
| 2017/0192507 | A1 | 7/2017 | Lee et al. |
| 2018/0011572 | A1 | 1/2018 | Wang |
| 2018/0335846 | A1 | 11/2018 | Toma et al. |
| 2019/0094968 | A1 | 3/2019 | Wen et al. |
| 2019/0155450 | A1 | 5/2019 | Kim |

FOREIGN PATENT DOCUMENTS

CN 109992099 A 7/2019

* cited by examiner

*Primary Examiner* — Mark Edwards
(74) *Attorney, Agent, or Firm* — WPAT, PC

(57) ABSTRACT

A touch device includes a substrate, multiple first electrodes, multiple second electrodes, multiple third electrodes, and a control circuit. The control circuit senses a touch position based on a first signal from the first electrodes. The control circuit transmits a second signal to the second electrodes based on the touch position, such that the second electrodes provide a first haptic feedback which is parallel to a top surface of the substrate. The control circuit also transmits a third signal to the third electrodes based on the touch position, such that the third electrodes provide a second haptic feedback along with a normal vector of the top surface of the substrate.

10 Claims, 4 Drawing Sheets

TOUCH DEVICE AND DISPLAY DEVICE FOR PROVIDING HAPTIC FEEDBACK

BACKGROUND

Field of Invention

The present disclosure is related to a touch device capable of providing haptic feedback in different directions.

Description of Related Art

Many electronic devices provide feedback to users through various stimuli, such as vision, sound, and haptic feedback, which can enhance the user experience of interacting with electronic devices. For example, mechanical buttons can provide feedback through the action of springs. Some devices can also provide users with vibration feedback through a motor.

SUMMARY

Embodiments of the present disclosure provide a touch device including a substrate, multiple first electrodes, multiple second electrodes, multiple third electrodes, and a control circuit. The substrate has a first side and a second side opposite to the first side. At least a portion of the first electrodes are disposed at the first side of the substrate. At least a portion of the second electrodes are disposed at the first side of the substrate. A portion of the third electrodes are disposed at the first side of the substrate, and another portion of the third electrodes are disposed at the second side of the substrate. The control circuit is electrically connected to the first electrodes, the second electrodes, and the third electrode. The control circuit is configured to sense at least one touch position based on a first signal from the first electrodes. The control circuit is configured to transmit at least one second signal to at least one of the second electrodes based on the touch position, such that the second electrodes provide a first haptic feedback which is parallel to a top surface of the substrate. The control circuit is configured to transmit a third signal to one of the third electrodes based on the touch position, such that the third electrodes provide a second haptic feedback which is along with a normal vector of the top surface of the substrate.

In some embodiments, the first electrodes are touch electrodes, the second electrodes are electrostatic electrodes, and the third electrodes are electroactive polymers electrodes.

In some embodiments, the control circuit is configured to transmit two different second signals to two of the second electrodes respectively, and the two different second signals have different voltages or frequencies.

In some embodiments, the control circuit is configured to transmit a ground voltage to another one of the third electrodes that is disposed at the second side of the substrate and opposite to the one of the third electrodes.

In some embodiments, the control circuit is configured to determine a number of the touch position in a time period. If the number of the touch position in the time period is equal to one, the control circuit is configured to transmit the third signal to the one of the third electrodes without transmitting the second signal.

In some embodiments, if the number of the touch position in the time period is greater than one, the control circuit is configured to determine whether a distance between consequent two of the touch positions in a time order is greater than a threshold. If the distance is greater than the threshold, the control circuit is configured to transmit the third signal to the third electrodes in the consequent two of the touch positions.

In some embodiments, if the distance is less than or equal to the threshold, the control circuit is configured to transmit two different second signals to the second electrodes in the consequent two of the touch positions.

In some embodiments, shapes of the first electrodes, the second electrodes, and the third electrodes are identical to each other.

In some embodiments, the shapes of the first electrodes, the second electrodes, and the third electrodes are quadrilaterals. Each of the first electrodes is adjacent two of the second electrodes and two of third electrodes.

From another aspect, embodiments of the present disclosure provide a display device including a display panel, a touch device, and a control circuit. The touch device includes a substrate, multiple first electrodes, multiple second electrodes, and multiple third electrodes. The substrate has a first side and a second side opposite to the first side. At least a portion of the first electrodes are disposed at the first side of the substrate. At least a portion of the second electrodes are disposed at the first side of the substrate. A portion of the third electrodes are disposed at the first side of the substrate, and another portion of the third electrodes are disposed at the second side of the substrate. The control circuit is electrically connected to the first electrodes, the second electrodes, and the third electrode. The control circuit is configured to sense at least one touch position based on a first signal from the first electrodes. The control circuit is configured to transmit at least one second signal to at least one of the second electrodes based on the touch position, such that the second electrodes provide a first haptic feedback which is parallel to a top surface of the substrate. The control circuit is configured to transmit a third signal to one of the third electrodes based on the touch position, such that the third electrodes provide a second haptic feedback which is along with a normal vector of the top surface of the substrate.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
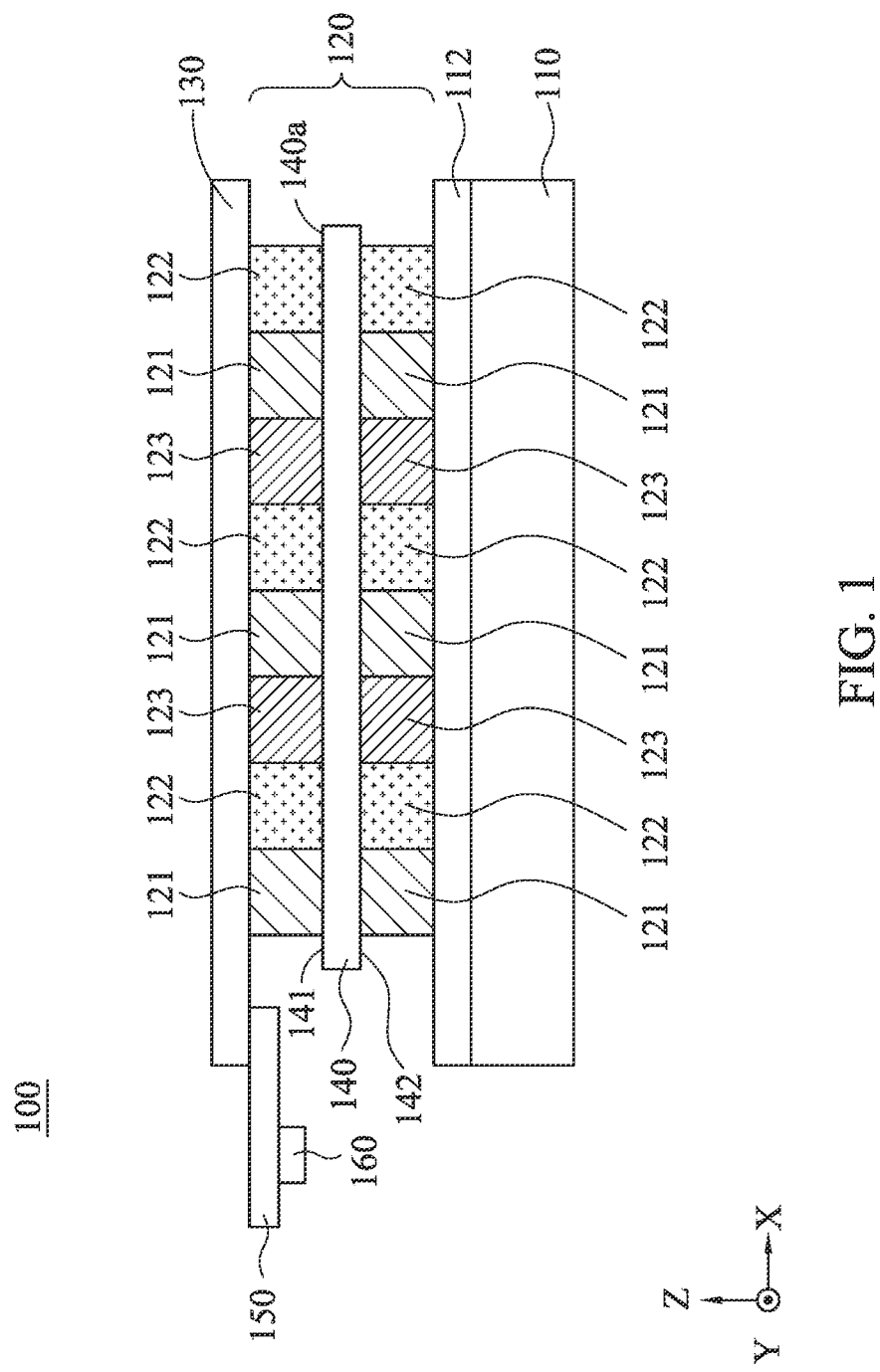
FIG. 1 is a side view of a display device in accordance with an embodiment.
Figure 2:
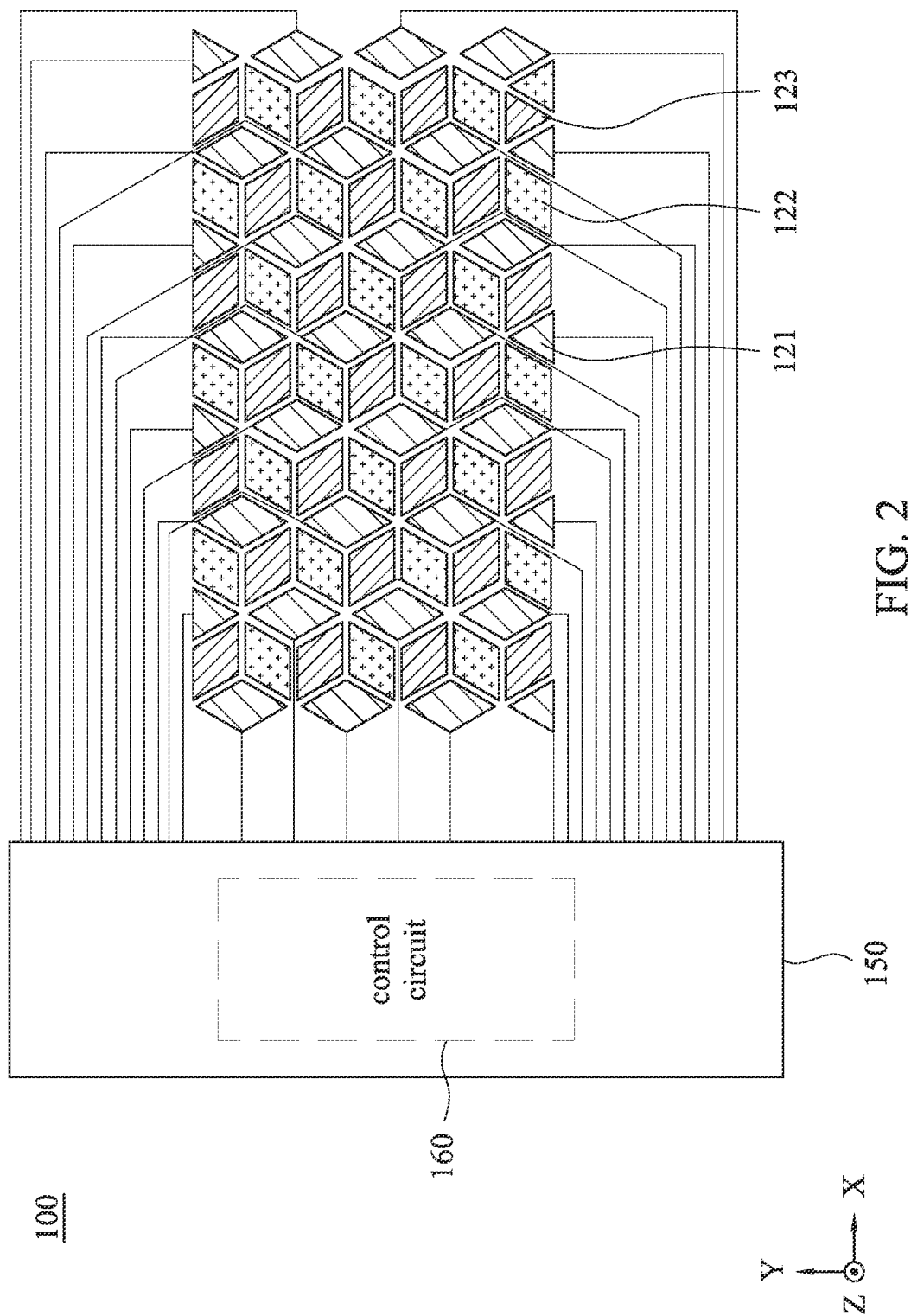
FIG. 2 is a top view of the display device in accordance with an embodiment.

FIG. 1 is a side view of a display device in accordance with an embodiment. FIG. 2 is a top view of the display device in accordance with an embodiment. Referring to FIG. 1 and FIG. 2, a display device 100 includes a display panel 110, a buffer layer 112, a touch device 120, a protection cover 130, a flexible printed circuit (FPC) board 150, and a control circuit 160. The display panel 110 may be a liquid crystal display panel, an organic light-emitting diode (LED) panel, or an active-matrix organic LED panel. The buffer layer 112 may be polyethylene terephthalate (PET). The touch device 120 includes a substrate 140 having transparent material. The substrate 140 has a first side 141 and a second side 142 opposite to the first side 141. The touch device 120 also includes first electrodes 121, second electrodes 122, and third electrodes 123 that are disposed at the first side 141 and/or the second side 142. The protection cover 130 covers the touch device 120. The FPC board 150 is disposed at a side of the protection cover 130 facing the touch device 120. The control circuit 160 is disposed on the FPC board 150. Some devices (e.g. the protection cover 130 and the display panel 110) are not shown in FIG. 2 for simplicity.

The first electrodes 121, the second electrodes 122, and the third electrodes 123 are electrically connected to the control circuit 160 through multiple conducting lines, and not all of the conducting lines are shown in FIG. 2 for simplicity. The first electrodes 121 are also referred to touch electrodes and the sensation thereof may be based on self-inductance capacitor or mutual inductance capacitor. When the self-inductance capacitor is adopted, the first electrodes 121 are disposed at only one side (i.e. the first side 141 or the second side 142) of the substrate 140. When the mutual inductance capacitor is adopted, the first electrodes 121 are disposed at both sides of the substrate 140. The control circuit 160 can sense a touch position of an object (e.g. a finger) based on a first signal from the first electrodes 121. People in the art should be able to appreciate the operation principle of the self-inductance capacitor and the mutual inductance capacitor which are not described in detail herein.

The second electrodes 122 are referred to electrostatic (ES) electrodes for generating electrostatic to attract the user's finger. When the user's finger slides on the protection cover 130, the control circuit 160 can transmit different second signals to different second electrodes 122 so that the user can feel different attraction forces. The said different second signals may have different voltages or frequencies. The second electrode 122 can provide haptic feedback along X direction and Y direction which are parallel to a top surface 140a of the substrate 140. In some embodiments, the second electrodes 122 are disposed at only one side of the substrate 140. In some embodiments, the second electrodes 122 are disposed at both sides of the substrate 140.

The third electrodes 123 are referred to electroactive polymers (EAP) electrodes. The third electrodes 123 are disposed at both sides of the substrate 140. The control circuit 160 can transmit a third signal to the third electrodes 123 at the first side 141, and transmit a ground voltage to the third electrodes 123 at the second side 142. The third electrodes 123 at the first side 141 are opposite to the third electrodes 123 at the second side 142 respectively. In other words, the projection of the third electrode 123 receiving the third signal onto the substrate 140 overlaps with the projection of the third electrode 123 receiving the ground voltage onto the substrate 140. The substrate 140 has flexible material, and the potential difference between the third signal and the ground voltage generates an attraction force to compress the substrate 140, such that the user can feel the haptic feedback in Z direction which is also the normal vector of the top surface 140a of the substrate 140. In some embodiments, the third electrode 123 may be deformed after receiving the third signal so as to provide the haptic feedback in the Z direction.

In the embodiment of FIG. 2, the shapes of the first electrodes 121, the second electrodes 122, and the third electrodes 123 are identical to each other such as quadrilaterals, but the present disclosure is not limited thereto. In addition, each first electrode is adjacent to two second electrodes and two third electrodes; each second electrode is adjacent to two first electrodes and two third electrodes; and each third electrode is adjacent to two first electrodes and two second electrodes. In other words, each edge of each electrode is adjacent to a different electrode.

In the embodiment, a touch position is sensed by the first electrodes 121, and then the second signal is transmitted to the second electrode 122 based on the touch position, and the third signal is transmitted to the third electrode 123 based on the touch position. Accordingly, the user can feel the haptic feedback in the X, Y, and Z directions simultaneously.

Figure 3:
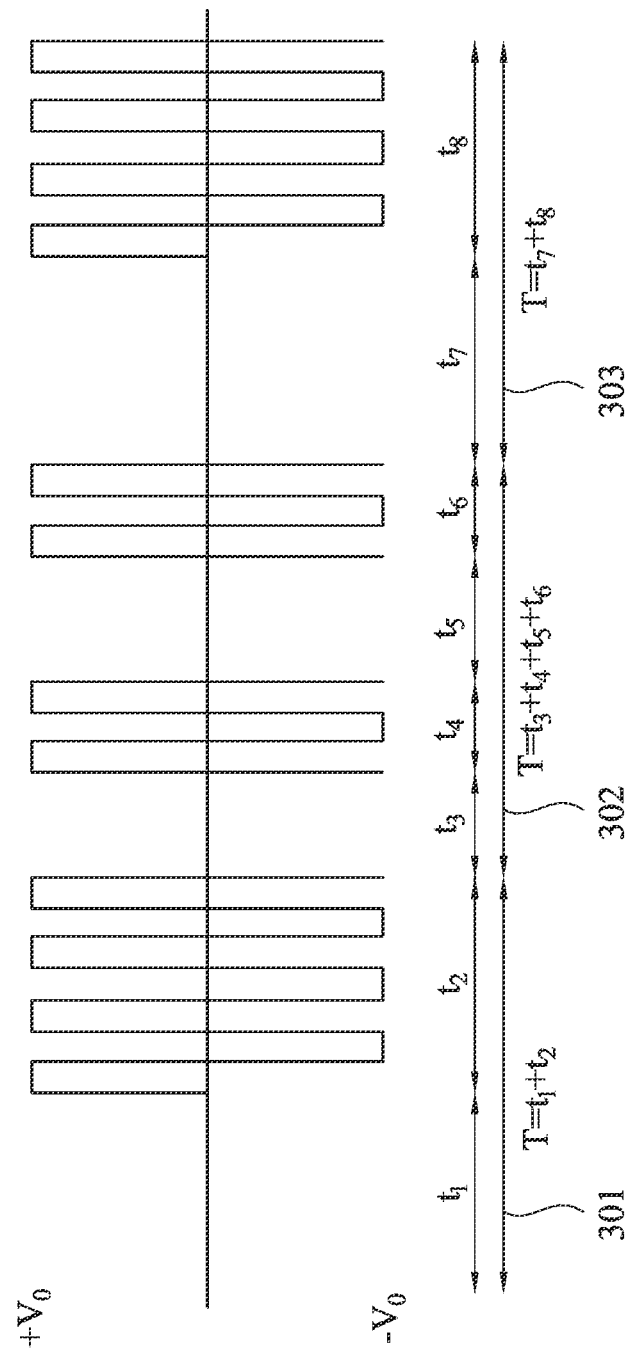
FIG. 3 is a timing diagram of signals in accordance with an embodiment.

FIG. 3 is a timing diagram of signals in accordance with an embodiment. Three frame periods 301-303 are illustrated in FIG. 3. Time division is adopted to sense touch positions and provide different haptic feedbacks. For example, the frame period 301 includes a first period $t_1$ and a second period $t_2$. The first period $t_1$ is used to enable the first electrodes 121 to sense a touch position, and based on the touch position the third electrodes 123 are enabled in the second period $t_2$ to provide the haptic feedback in the Z direction. The frame period 302 includes a third period $t_3$ to a sixth period $t_6$. The third period $t_3$ is used to enable the first electrodes 121 to sense a touch position. The fourth period to is used to enable the second electrodes 122 to provide haptic feedback in the X and Y directions. The fifth period $t_5$ is used to enable the first electrodes 121 again, and then the third electrodes 123 are enabled in the sixth period $t_6$. The third frame period 303 includes a seventh period $t_7$ and an eighth period $t_8$. The seventh period $t_7$ is used to enable the first electrodes 121, and the second electrodes 122 are enabled in the eighth period $t_8$. Each frame period can be divided into sub-periods (e.g. periods $t_1$-$t_8$). The first electrodes 121 are enabled in one sub-period to sense a touch position before the second electrodes 122 or the third electrodes 123 are enabled in other sub-periods. The number of the sub-periods in each frame period is not limited in the present disclosure. The order for enabling the second electrodes 122 and the third electrodes 123 are not limited. For example, the order of the sub-periods in the frame period 302 may be $t_5$, $t_6$, $t_3$ and $t_4$. In addition, the sub-period for enabling the second electrodes 122 (or third electrode 123) may be repeated in one time frame. For example, the time frame 301 may include 6 sub-periods which are $t_1$, $t_2$, $t_1$, $t_2$, $t_7$, and $t_8$.

Figure 4:
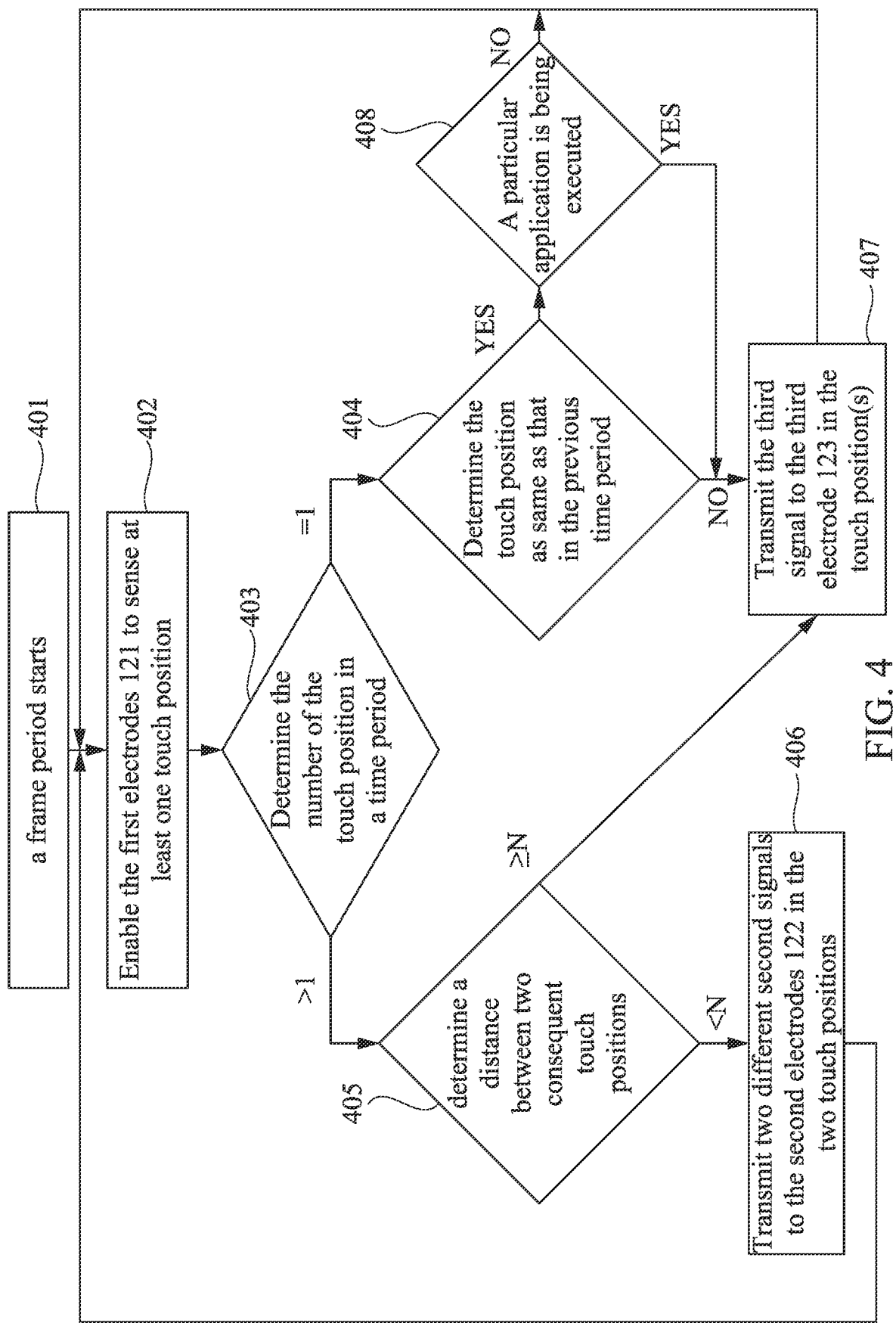
FIG. 4 is a diagram illustrating a flow chart of a method for providing haptic feedback.

When the user's finger stays in the same position, the third electrodes 123 may be enabled to provide haptic feedback in the Z direction. When the user's finger slides on the display device 100, the second electrodes 122 are enabled to provide haptic feedback in the X and Y directions. FIG. 4 is a diagram illustrating a flow chart of a method for providing haptic feedback. Referring to FIG. 4, a frame period starts in step 401. In step 402, the first electrodes 121 are enabled to sense at least one touch position.

In step 403, the number of the touch position(s) in a time period is determined. The time period may be equal to, longer than, or shorter than one frame periods. When the user's finger stays in the same position in the time period, it is determined that the number of the touch position(s) is equal to one. If the user's finger slides from a position to another position in the time period, then it is determined that the number of the touch position(s) is greater than one. In other words, step 403 determines the time relationship of the touch position.

If the number of the touch position(s) is equal to one, in step 404, it is determined if the touch position is as same as that in the previous time period. If the result of step 404 is "NO", then in step 407, the third signal is transmitted to the third electrode 123 in the current touch position to provide haptic feedback in the Z direction. If the result of step 404 is "YES", in step 408, it is determined if a particular application is being executed. The application is, for example, a shooting game in which a shooting function is activated when the user's finger stays on the screen and therefore the haptic feedback in the Z direction is still provided for multiple times. If the result of step 408 is "YES", it goes to the step 407, otherwise it goes back to the step 402 to sense the touch position in the next time period. Note that no second signal is transmitted to the second electrodes 122 in the step 407.

When the number of the touch position(s) is greater than one, in step 405, it is determined whether a distance between two consequent touch positions in a time order is greater than a threshold (e.g. N pixels where N is a positive integer). If the distance is greater than N pixels, it means the two touch positions do not correspond to the same slide motion, and therefore step 407 is performed to transmit the third signals to the third electrodes 123 in these two touch positions. If the distance is less than N pixels, then it means these two touch positions correspond to the same slide motion, and therefore step 406 is performed to transmit two different second signals to the second electrodes 122 in the two touch positions respectively. The two second signals may have different voltages or frequencies to generate different attraction forces. In some embodiments, the voltages or frequencies of the second signals are increasing or decreasing from time to time, and therefore the user can fell increasing or decreasing friction when his or her finger slides. After the step 407 or the step 406 is performed, it goes back to the step 402 to sense touch positions again.

In some embodiments, the control circuit 160 can cooperate with other driving circuits. For example, a first driving circuit is configured to drive the first electrodes, a second driving circuit is configured to drive the second electrodes, and a third driving circuit is configured to drive the third electrodes. These driving circuits may be integrated into the control circuit 160 or disposed outside the control circuit 160 and electrically connected to the control circuit 160.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch device, comprising:
   a substrate having a first side and a second side opposite to the first side;
   a plurality of first electrodes, wherein at least a portion of the first electrodes are disposed at the first side of the substrate;
   a plurality of second electrodes, wherein at least a portion of the second electrodes are disposed at the first side of the substrate;
   a plurality of third electrodes, wherein a portion of the third electrodes are disposed at the first side of the substrate, and another portion of the third electrodes are disposed at the second side of the substrate; and
   a control circuit electrically connected to the first electrodes, the second electrodes, and the third electrode,
   wherein the control circuit is configured to sense at least one touch position based on a first signal from the first electrodes,
   wherein the control circuit is configured to transmit at least one second signal to at least one of the second electrodes based on the at least one touch position, such that the at least one of the second electrodes provides a first haptic feedback which is parallel to a top surface of the substrate,
   wherein the control circuit is configured to transmit a third signal to one of the third electrodes based on the at least one touch position, such that the one of the third electrodes provides a second haptic feedback along with a normal vector of the top surface of the substrate.

2. The touch device of claim 1, wherein the first electrodes are touch electrodes, the second electrodes are electrostatic electrodes, and the third electrodes are electroactive polymers electrodes.

3. The touch device of claim 2, wherein the control circuit is configured to transmit two different second signals to two of the second electrodes respectively, and the two different second signals have different voltages or frequencies.

4. The touch device of claim 2, wherein the control circuit is configured to transmit a ground voltage to another one of the third electrodes that is disposed at the second side of the substrate and opposite to the one of the third electrodes.

5. The touch device of claim 1, wherein the control circuit is configured to determine a number of the at least one touch position in a time period,
   if the number of the at least one touch position in the time period is equal to one, the control circuit is configured to transmit the third signal to the one of the third electrodes without transmitting the at least one second signal.

6. The touch device of claim 5, wherein if the number of the at least one touch position in the time period is greater than one, the control circuit is configured to determine whether a distance between consequent two of the touch positions in a time order is greater than a threshold,
   where if the distance is greater than the threshold, the control circuit is configured to transmit the third signal to the third electrodes in the consequent two of the touch positions.

7. The touch device of claim 6, wherein if the distance is less than or equal to the threshold, the control circuit is configured to transmit two different second signals to the second electrodes in the consequent two of the touch positions.

8. The touch device of claim 1, wherein shapes of the first electrodes, the second electrodes, and the third electrodes are identical to each other.

9. The touch device of claim 8, wherein the shapes of the first electrodes, the second electrodes, and the third electrodes are quadrilaterals, and each of the first electrodes is adjacent to two of the second electrodes and two of third electrodes.

10. A display device comprising:
  a display panel;
  a touch device comprising:
    a substrate having a first side and a second side opposite to the first side;
    a plurality of first electrodes, wherein at least a portion of the first electrodes are disposed at the first side of the substrate;
    a plurality of second electrodes, wherein at least a portion of the second electrodes are disposed at the first side of the substrate; and
    a plurality of third electrodes, wherein a portion of the third electrodes are disposed at the first side of the substrate, and another portion of the third electrodes are disposed at the second side of the substrate; and
  a control circuit electrically connected to the first electrodes, the second electrodes, and the third electrodes,
  wherein the control circuit is configured to sense at least one touch position based on a first signal from the first electrodes,
  wherein the control circuit is configured to transmit at least one second signal to at least one of the second electrodes based on the at least one touch position, such that the at least one of the second electrodes provides a first haptic feedback which is parallel to a top surface of the substrate,
  wherein the control circuit is configured to transmit a third signal to one of the third electrodes based on the at least one touch position, such that the one of the third electrodes provides a second haptic feedback along with a normal vector of the top surface of the substrate.

* * * * *